C. A. JUENGST.
CLUTCH.
APPLICATION FILED APR. 19, 1911.
1,014,481. Patented Jan. 9, 1912.
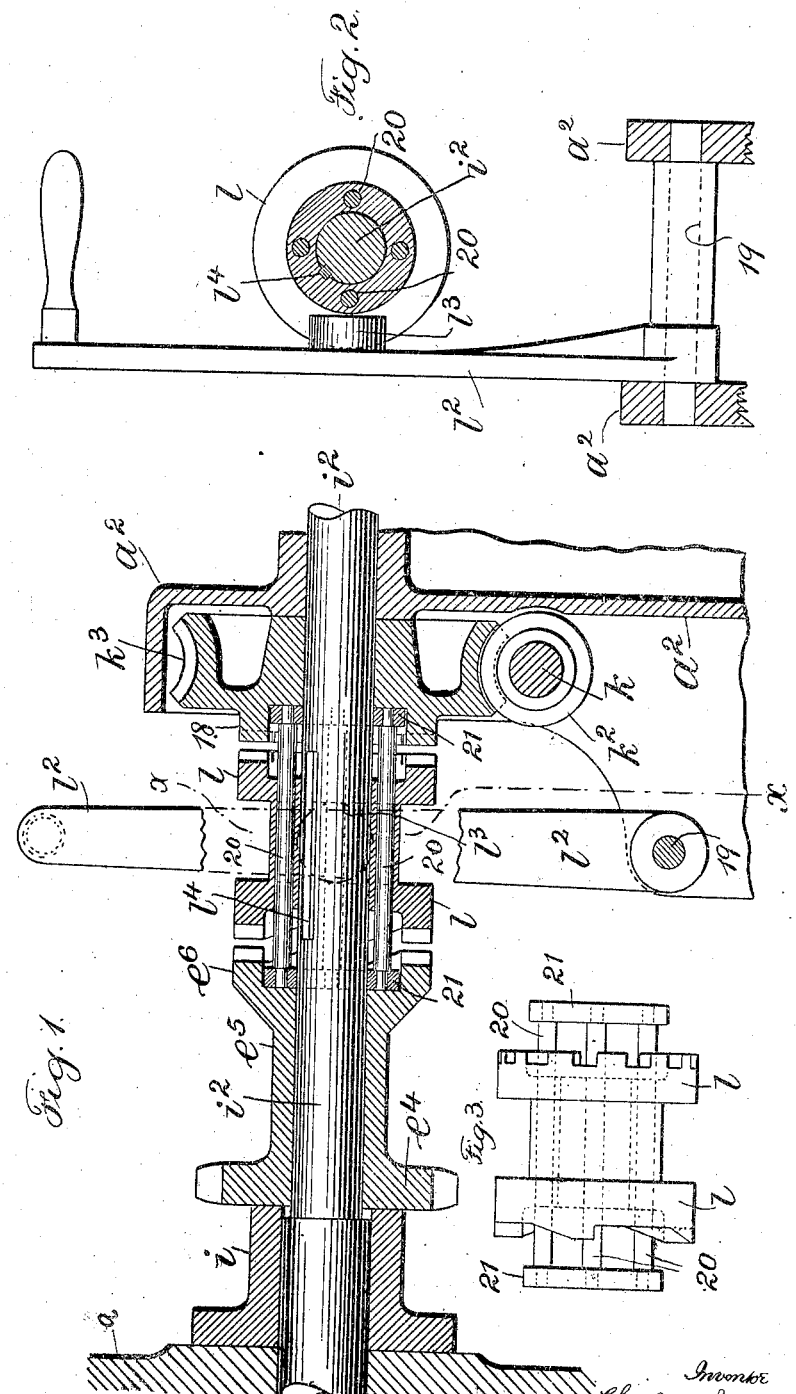

UNITED STATES PATENT OFFICE.

CHARLES A. JUENGST, OF CROTON FALLS, NEW YORK, ASSIGNOR TO HIGLEY MACHINE COMPANY, OF CROTON FALLS, NEW YORK, A CORPORATION OF NEW YORK.

CLUTCH.

1,014,481.  Specification of Letters Patent.  Patented Jan. 9, 1912.

Original application filed August 9, 1910, Serial No. 576,383. Divided and this application filed April 19, 1911. Serial No. 621,989.

*To all whom it may concern:*

Be it known that I, CHARLES A. JUENGST, a citizen of the United States, residing at Croton Falls, in the county of Westchester and State of New York, have invented an Improvement in Clutches, of which the following is a specification.

My invention relates to an improvement in clutches, a part divided out of my application for Letters Patent of the United States, filed August 9, 1910, Serial No. 576,383, for metal sawing machines, and the object of my invention is the provision of a strong and suitable clutch for heavy machinery for communicating motion to oppositely moving parts.

In carrying out my invention and in connection with a shaft of suitable character, I employ a sliding clutch member thereon and means for actuating the same. The ends of this sliding clutch member are made as teeth adapted to engage juxtaposed clutch teeth also upon and surrounding said shaft and forming parts of other members to be operated through the sliding clutch member. A spline or key is secured longitudinally to said shaft, which key also passes through the sliding clutch member. The opposing faces of the other members are recessed around the said shaft to receive collars which form the ends of a cage member surrounding the shaft and comprising with said collars a series of longitudinal rods passing through the sliding clutch and spaced circumferentially. This cage member serves the purpose of spacing the members having clutch teeth and locating the same while leaving an exact area for the sliding clutch to move in.

In the drawing, Figure 1 is an elevation and vertical longitudinal section along the shaft and through the clutch device. Fig. 2 is an elevation and cross section at about the dotted line $x, x$, of Fig. 1, and Fig. 3 is an elevation of the cage and sliding device.

$a$ represents part of the frame of a machine and $a^2$ a housing also forming part of the same machine, and $i^2$ represents a shaft passing through said parts. Upon this shaft a bearing sleeve $i$ may be employed, and $e^5$ represents a sleeve having a sprocket $e^4$ at one end and a clutch $e^6$ at the other end; the teeth of the clutch being on the end and in a substantially vertical plane and the clutch within the teeth being recessed around the shaft $i^2$.

$k$ is a shaft through the housing, with a worm $k^2$ thereon meshing with a worm-wheel $k^3$ on the shaft $i^2$, and one face of this worm-wheel $k^3$ is provided with clutch teeth 18 surrounding the said shaft $i^2$ and in substantially a vertical plane and the said worm-wheel inside of the clutch teeth is recessed in a manner corresponding with the recess in the clutch $e^6$. There is a spline or key $l^4$ in the shaft $i^2$ and around said shaft and moving upon said spline or key is a sliding clutch $l$ having on one end teeth of similar character and adapted to engage the teeth of the clutch $e^6$, and on the other end teeth of a similar character and adapted to engage the clutch teeth 18 so that in one position of the sliding clutch $l$, the teeth 18 are engaged and in the other position the teeth of the clutch $e^6$. The central portion of this sliding clutch $l$ is reduced to receive a roller $l^3$ secured to a lever $l^2$ and this lever is connected by a pivot 19 to a lower portion of the housing $a^2$, and I employ a cage comprising the collars 21 in the recessed portions of the clutch $e^6$ and worm-wheel $k^3$, and between these collars, spaced apart, are rods 20; their reduced ends passing into said collars and the rods passing through holes in the sliding clutch $l$. This cage member serves the purpose of separating the sleeve $e^5$ from the hub of the worm-wheel $k^3$ and keeping these parts snugly and respectively against the bearing sleeve $i$ on the one hand and the housing $a^2$ on the other hand; also preventing any possible crowding or lack of free movement longitudinally of the screw shaft $i^2$ of the sliding clutch member.

The lever $l^2$ with its roller $l^3$ is employed for moving the sliding clutch $l$ longitudinally of the shaft $i^2$ and the rods 20 so as to engage the teeth of the adjacent members at either end thereof in order that the shaft $i^2$ may be rotated in opposite directions. This lever $l^2$ may be manually actuated in opposite directions, or mechanical devices may be employed for automatically actuating the same; the clutch device being the special feature of my present invention.

I claim as my invention:

1. In a device of the character described and in combination, a shaft adapted for rotation in opposite directions, a sliding clutch member surrounding said shaft and movable but non-revoluble thereon, clutch members adjacent to the opposite ends of the sliding clutch member provided with means for connection therewith, and a cage between said end members for spacing them apart and which cage also surrounds the aforesaid shaft and parts of which pass through the sliding clutch member.

2. In a device of the character described and in combination, a shaft, a clutch member surrounding the said shaft and having teeth on the end faces thereof and movable but non-revoluble along said shaft, means for actuating said clutch member, and clutch members at the respective ends of said sliding clutch member also provided with end teeth corresponding with the teeth of the sliding clutch member and adapted for engagement therewith, and said members recessed around said shaft and within the boundaries of their teeth, and a cage device comprising collars received in said recesses and rods spaced around said shaft and extending through the sliding clutch member and engaging said collars for maintaining the separated distance of the toothed elements at the opposite ends of the sliding clutch.

3. In a device of the character described and in combination, a shaft, suitable bearings therefor and a spline in said shaft, a sliding clutch member surrounding said shaft and means for moving the same along said spline, said sliding clutch member having end teeth, a sleeve and integral clutch member surrounding said shaft at one end of said sliding clutch member and a member having clutch teeth also surrounding said shaft at the other end of said sliding clutch member, and the said end clutch members within their clutch teeth recessed around said shaft, collars within said recesses surrounding said shaft and rods spaced around said shaft passing through the sliding clutch member and having reduced ends passing into said collars and the collars and rods forming a cage for maintaining the separated distance between the clutch members having clutch teeth at the opposite ends of the sliding clutch member, substantially as set forth.

Signed by me this 6th day of April 1911.

CHAS. A. JUENGST.

Witnesses:
GEO. T. PINCKNEY,
E. ZACHARIASEN.